(12) United States Patent
Otto

(10) Patent No.: US 9,630,751 B1
(45) Date of Patent: Apr. 25, 2017

(54) TRANSPORT BAG, A CONVEYING APPARATUS AND A METHOD FOR OPENING OR CLOSING A TRANSPORT BAG

(71) Applicant: DEMATIC LOGISTICS GMBH, Bielefeld (DE)

(72) Inventor: Thomas Otto, Bielefeld (DE)

(73) Assignee: DEMATIC LOGISTICS GMBH, Bielefeld (DE)

( * ) Notice: Subject to any disclaimer, the term of this patent is extended or adjusted under 35 U.S.C. 154(b) by 0 days.

(21) Appl. No.: 15/137,128

(22) Filed: Apr. 25, 2016

(30) Foreign Application Priority Data

Apr. 15, 2016 (EP) ..................................... 16165604

(51) Int. Cl.
| | |
|---|---|
| *B65D 33/24* | (2006.01) |
| *B65D 88/52* | (2006.01) |
| *B65G 17/20* | (2006.01) |
| *B65G 17/36* | (2006.01) |
| *B65D 33/16* | (2006.01) |
| *B65G 17/48* | (2006.01) |
| *B65G 17/32* | (2006.01) |

(52) U.S. Cl.
CPC ......... *B65D 33/24* (2013.01); *B65D 33/1683* (2013.01); *B65D 88/52* (2013.01); *B65G 17/20* (2013.01); *B65G 17/32* (2013.01); *B65G 17/36* (2013.01); *B65G 17/485* (2013.01)

(58) Field of Classification Search
CPC ................................ B65D 33/24; B65D 88/52
See application file for complete search history.

(56) References Cited

U.S. PATENT DOCUMENTS

| | | | | |
|---|---|---|---|---|
| 3,827,471 A * | 8/1974 | Gregory | ............ | B65D 88/1668 222/181.3 |
| 5,690,253 A * | 11/1997 | LaFleur | ................. | B66C 1/226 222/102 |
| 8,490,774 B2 * | 7/2013 | Janzen | ................. | B65G 19/025 198/384 |
| 8,607,963 B2 * | 12/2013 | Wend | .................. | B65G 19/025 141/250 |

(Continued)

FOREIGN PATENT DOCUMENTS

EP    2130968 A1    12/2009

*Primary Examiner* — Thomas Randazzo
(74) *Attorney, Agent, or Firm* — Patent Portfolio Builders PLLC (57) ABSTRACT

A transport bag for a conveying apparatus includes a first bag wall, a second bag wall, and a suspension apparatus arranged at an upper end of one of the bag walls. Closing elements, which can reversibly be coupled to each other, are arranged at a bottom end of the bag walls remote from the suspension apparatus, with which the bottom ends of the bag walls can be connected to each other to form a bag base. The closing elements are latching strips oriented in parallel with respect to each other and can be latched onto each other. The latching strips are formed in such a way that they are displaceable from a transport position closing the transport bag at the bottom end and latches them together by displacement relative to each other in the direction of the longitudinal axis of the latching strips into an unlatching position in which the latching strips are releasable from each other, for opening the transport bag at the bottom end.

16 Claims, 7 Drawing Sheets

(56) References Cited

U.S. PATENT DOCUMENTS

| | | | |
|---|---|---|---|
| 9,187,252 B2 * | 11/2015 | Wend ................... | B65G 17/12 |
| 9,511,940 B2 * | 12/2016 | Schonenberger ...... | B65G 17/20 |
| 2015/0225177 A1 * | 8/2015 | Schonenberger ...... | B65G 17/20 |
| | | | 198/687.1 |

* cited by examiner

TRANSPORT BAG, A CONVEYING APPARATUS AND A METHOD FOR OPENING OR CLOSING A TRANSPORT BAG

CROSS-REFERENCE TO RELATED APPLICATIONS

The present application claims priority under 35 USC §119 to European Patent Application 16 165 604.6, filed Apr. 15, 2016, the entire disclosure of which is herein expressly incorporated by reference.

BACKGROUND AND SUMMARY OF THE INVENTION

Exemplary embodiments of the present invention relate to a transport bag for a conveying apparatus, a conveying apparatus, a method for opening a transport bag, and a method for closing a transport bag.

European patent document EP 2 130 968 B1 discloses a transport bag substantially consisting of two walls that are connected at an upper end via a bracket to each other, on which a suspension apparatus is used for suspension in a rail of a conveying apparatus. The bottom ends of the bag walls are connected to each other via a coupling, which can be actuated via an actuating mechanism arranged at the upper end of one of the bag walls in order to couple the bottom ends of the walls to each other for transporting an item. A bag is thus formed in the mutually coupled state. The walls of the bag are separated from each other for unloading so that the item transported in the transport bag can fall out in the downward direction.

Exemplary embodiments of the present invention are directed to a transport bag, a conveying apparatus, and a method for opening and closing such a transport bag with which an even further simplified opening and closing of the transport bag at the bottom end is achieved.

The transport bag in accordance with the invention comprises a first bag wall, a second bag wall, and a suspension apparatus arranged at an upper end of one of the bag walls. Closing elements, which can reversibly be coupled to each other, are arranged at a bottom end of the bag walls, which is remote from the suspension apparatus, with which the bottom ends of the bag walls which can be connected to each other form a bag base that closes the transport bag at the bottom.

The closing elements are formed as latching strips that can be latched onto each other and are oriented away from each other and in parallel to each other. The latching strips are displaceable from a mutually latched transport position, which closes the transport bag at the bottom end to an unlatching position by relative displacement against each other in the direction of the longitudinal axis of the latching strips, in which the latching strips can be released from each other at the bottom end for opening the transport bag.

Such a transport bag can be opened in the downward direction and reclosed in a relatively simple way. This also leads to an unloading process of the transport bag that can be carried out in a simple way.

Inadvertent opening of the transport bag is further reliably prevented by forming the closing elements as latching strips that can be latched onto each other and are displaceable in the longitudinal direction relative to each other.

At the same time, the displacement of the latching strips with respect to each other in the longitudinal direction of the latching strips provides a particularly simple unlatching and therefore very simple opening of the transport bag in the downward direction.

According to an advantageous embodiment of the invention, at least two latching elements are arranged on the first latching strip, which latching elements are spaced from each other in the direction of the longitudinal axis of the latching strip and which are retained in latching recesses of the second latching strip in the mutually latched state of the latching strips, which are spaced from each other in the direction of their longitudinal axis.

This allows simple latching of the latching elements in the latching recesses. Unlatching is achieved by a linear displacing movement of the latching strips.

The latching strips are formed in an equally long way according to an advantageous embodiment. The first latching strip, in the state when latched to the second latching strip, is arranged in the direction of its longitudinal axis in a parallel offset manner in relation to the second latching strip.

The offset amount of the parallel offset of the latching strips is preferably between 1 cm and 10 cm, especially between 1 cm and 5 cm, thus ensuring a sufficiently stable latching in the latched state on the one hand and on the other hand a sufficient flexural stiffness of the protruding ends of the latching strips in the latched state during the unlatching process in particular.

The latching elements according to a preferred embodiment are formed as hooks and the latching recesses as an undercut.

The latching elements are C-shaped in an especially preferred manner, and the undercuts are formed to engage from behind.

The engaging around or behind the undercuts by the latching element ensures especially reliable latching of the latching strips onto each other.

According to a further advantageous embodiment, a lug is integrally formed on the first latching strip that protrudes in the direction of the second latching strip and rests in the mutually latched state of the latching strips in a recess on a lateral edge of the second latching strip facing the first latching strip, wherein the width of the recess in the direction of the longitudinal axis of the second latching strip is dimensioned in such a way that the lug is pushed out of the recesses in the case of latching strips that are displaced to the unlatching position.

This ensures reliable separation of the latching strips from each other directly after the unlatching process because the lug, after the displacement of the latching strips to the unlatching position, presses the second latching strip away from the first latching strip perpendicularly to the longitudinal direction of the latching strips.

According to a further advantageous embodiment, the upper ends of the walls of the bag that are close to the suspension apparatus are fastened to a rod assembly that is pivotable about a pivot axis oriented parallel to the longitudinal axis of the latching strips and which forms a bag filling opening. The suspension apparatus is preferably fastened to the rod assembly.

Such a rod assembly allows simple opening of the upper region of the transport bag for filling the same with the item or items to be transported.

The walls of the bag are preferably connected to each other by two foldable side walls. It can also be considered, depending on the size of the items to be conveyed, to connect the walls of the bag at the side edges merely via ropes, tapes or the like in order to prevent the transported item from laterally dropping out of the bag.

The latching strips are preferably tightly clamped to the walls of the bag. It can also be considered to sew the latching strips into pockets provided for this purpose in the walls of the bag or to fasten them in any other way.

The conveying apparatus in accordance with the invention includes one or several transport bags as described above.

An unloading station of the conveying apparatus preferably comprises two pressure stamps with a pressure surface extending perpendicularly to the direction of the longitudinal axis of the latching strips, between which the transport bag can be positioned.

At least one of the pressure stamps is displaceable in the direction of the longitudinal axis of the latching strips in such a way that the distance between the pressure stamps is variable between an insertion amount that is greater than the total length of the parallel offset latching strips in the mutually latched state and an unlatching amount which corresponds to the length of the latching strips.

Such an unloading station allows automatic unlatching of the latching strips in a simple way and thus an automated opening of the transport bag for unloading the item transported in the transport bag.

Closure of the bottom region of the transport bag occurs in an automated manner in an especially preferred way.

For this purpose, a bag closing station is provided downstream of the unloading station in the transport direction, comprising two pressure plates which can be moved towards each other perpendicularly to the direction of the longitudinal axis of the latching strips and between which the transport bag can be positioned, wherein the pressure plates are movable from a position accommodating the mutually separated latching strips between themselves to a closing position which presses the latching strips together perpendicularly to the direction of the longitudinal axis of the latching strips and which latches them together.

The pressure plates are pivotable in an especially preferred manner about a pivot axis extending parallel to the longitudinal axis of the latching strips and can thus be fastened beneath the transport bags guided to the bag closing station. The transport bag can thus be guided to the engagement region of the pressure plates without touching the pressure plates. The pressure plates are then pivoted to the closing position and the latching strips of the transport bag are latched onto each other by being pressed together.

The method in accordance with the invention for opening the transport bag involves simple opening steps for opening the transport bag, which steps can be carried out in a reliable manner.

The closure of the transport bag by the method in accordance with the invention for closing the transport bag is also enabled in a simple and reliable way.

BRIEF DESCRIPTION OF THE DRAWING FIGURES

Preferred embodiments of the invention are explained below in closer detail in the drawings, wherein.

DETAILED DESCRIPTION

In the following description of the drawings, terms such as top, bottom, left, right, front, rear, etc. exclusively relate to the exemplary illustration and position of the transport bag, wall of the bag, the latching strip, the latching elements, the conveying apparatus and the like selected in the respective figures. These references shall not be understood in a limiting manner, i.e. these references can change by various operating positions or through mirror-symmetric design or the like.

An embodiment of a transport bag in accordance with the invention is designated in its entirety in FIGS. 1 to 5 by the reference numeral 1. The transport bag 1 comprises a first bag wall 2 and a second bag wall 3.

Both bag walls 2, 3 are preferably fixed at an upper end to a rod assembly 6. The rod assembly 6 is preferably formed as a rectangular frame forming a bag filling opening 16, through which the transport bag 1 can be filled with an item to be transported or several such items to be transported.

Figure 1:
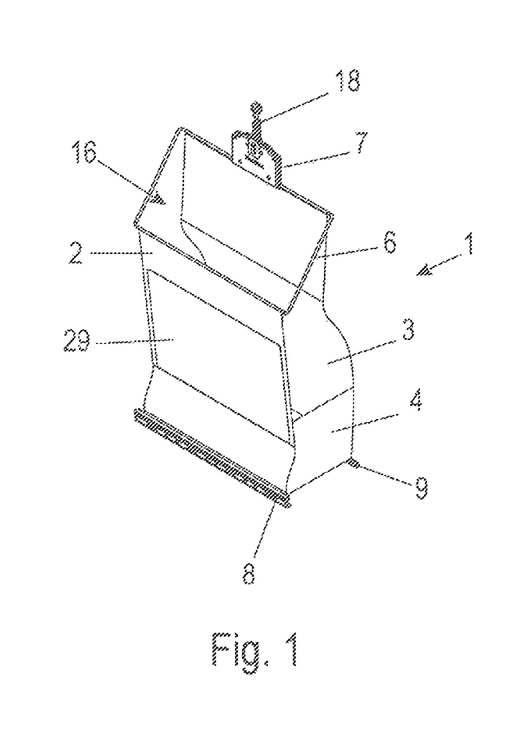
FIG. 1 shows a schematic perspective view of an embodiment of a transport bag in accordance with the invention in the open state.
Figure 2:
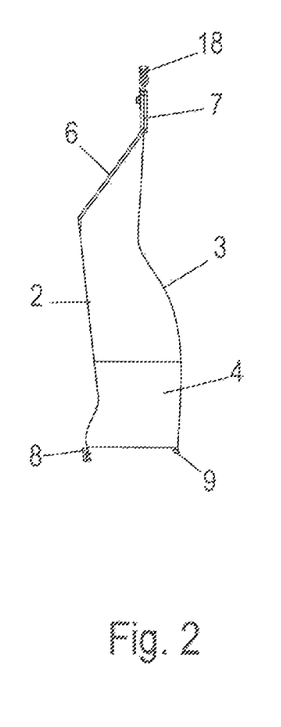
FIG. 2 shows a side view of the transport bag shown in FIG. 1.
Figure 4:
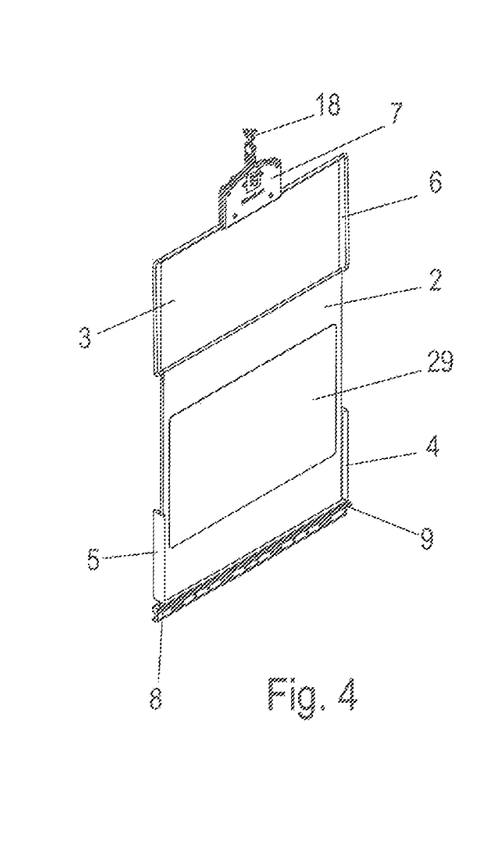
FIG. 4 shows a perspective view of the transport bag of FIG. 1 in the closed state.
Figure 5:
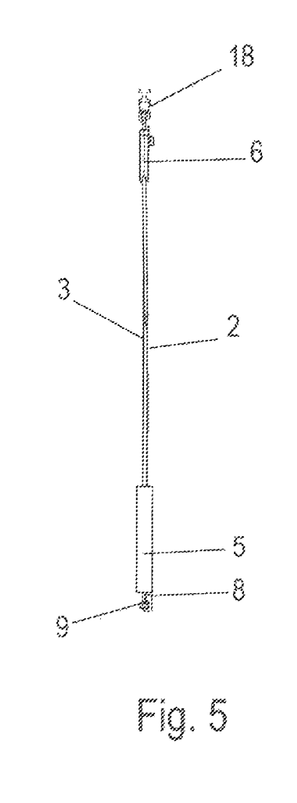
FIG. 5 shows a side view of the transport bag in the closed state.
Figure 6:
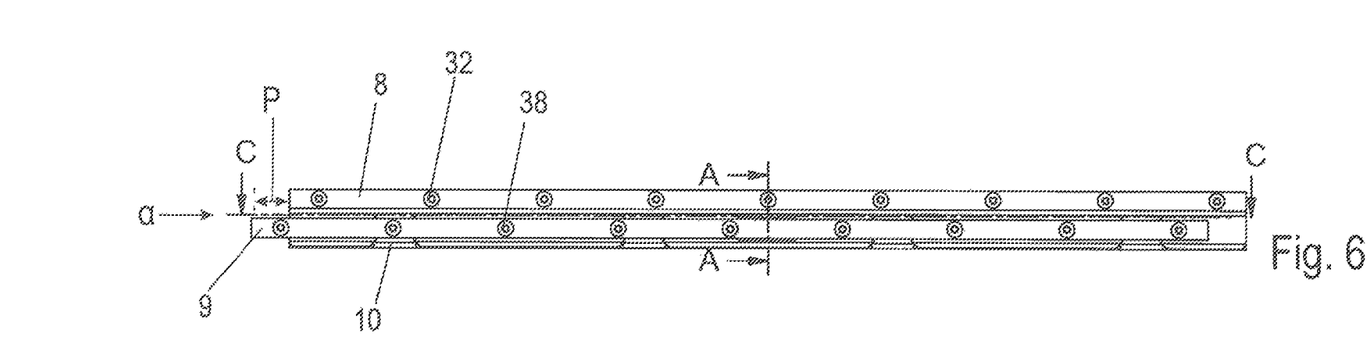
FIG. 6 shows a front view of the latching strips in the mutually latched state.

For the purpose of filling the transport bag, the rod assembly 6, which is formed as a rectangular frame, is pivoted from a vertically oriented position, shown in FIG. 4 or 5, about one of the rod assembly parts to which one of the bag walls 2, 3 is fixed to a position which is angular to the vertical or a horizontal position, as shown in FIG. 1 or 2.

A suspension apparatus 7 is arranged at the upper end one of the bag walls 2, 3, i.e. in the embodiment according to FIG. 1 at the upper end of the second bag wall 3. The suspension apparatus 7 preferably engages around a limb of the rod assembly 6 on which the second bag wall 3 is fastened.

Figure 13:
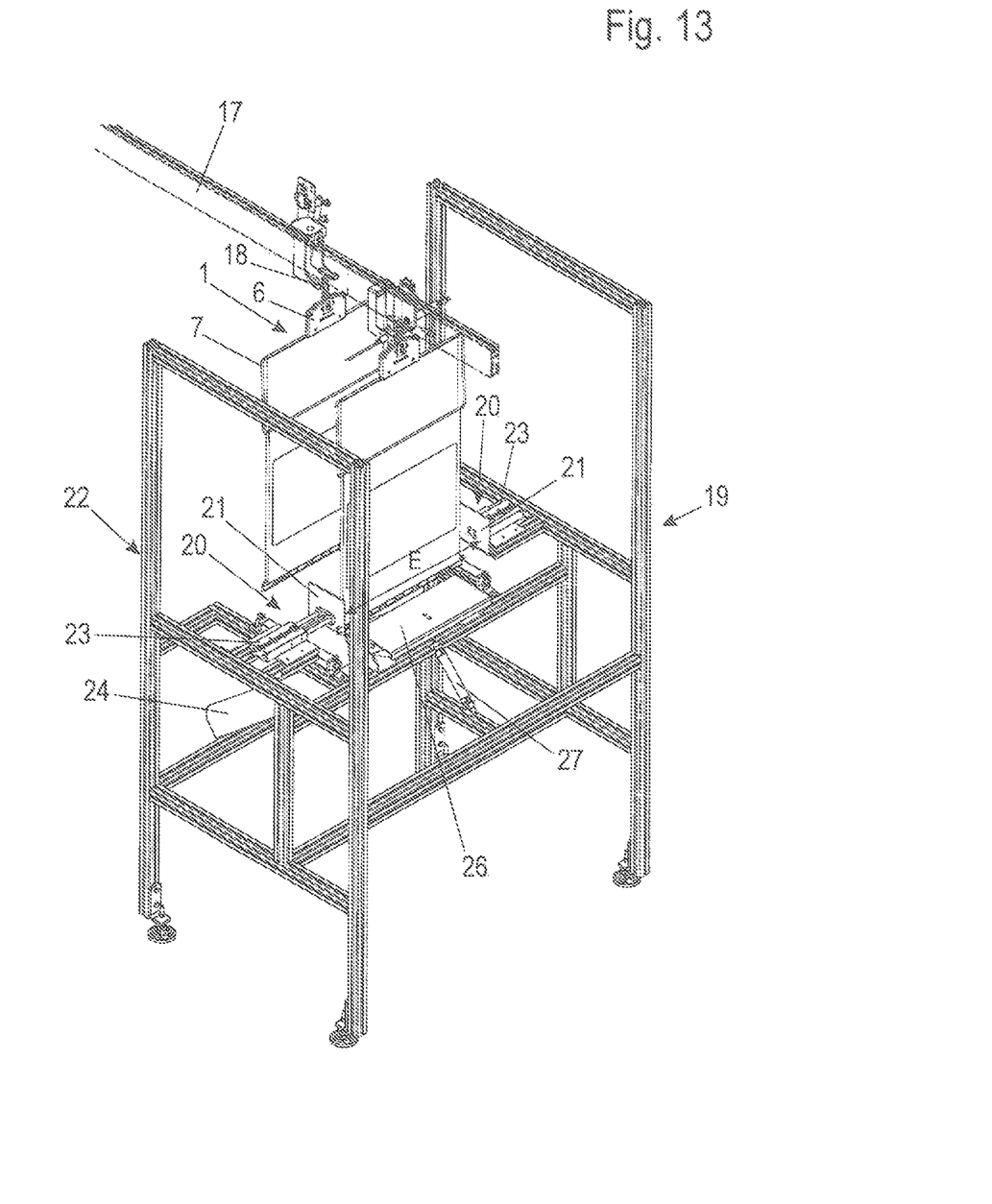
FIG. 13 shows a perspective view of an unloading station of an embodiment of a conveying apparatus in accordance with the invention.

A holding adapter 18 is preferably connected to the suspension apparatus 7, with the head piece of the holding adapter being insertable into a rail profile 17 of a conveying apparatus with a transport chain movable in a transport direction X, as shown in FIG. 13 for example.

The bag walls 2, 3 are preferably connected by side walls 4, 5 in the bottom region of the transport bag 1. Both the bag walls 2, 3 and also the side walls 4, 5 consist at least partly of a textile material. It can also be considered to form a section of the first or second bag wall 2, 3 in a dimensionally stable manner as a plate 29, as shown in FIG. 1.

Closing elements, which can be coupled to each other in a reversible manner, are arranged instead of a separate bag base at the bottom end of the bag walls 2, 3 which is remote from the suspension apparatus 7, with which the bottom ends of the bag walls 2, 3 can be connected to each other to form a bag base.

Figure 10:
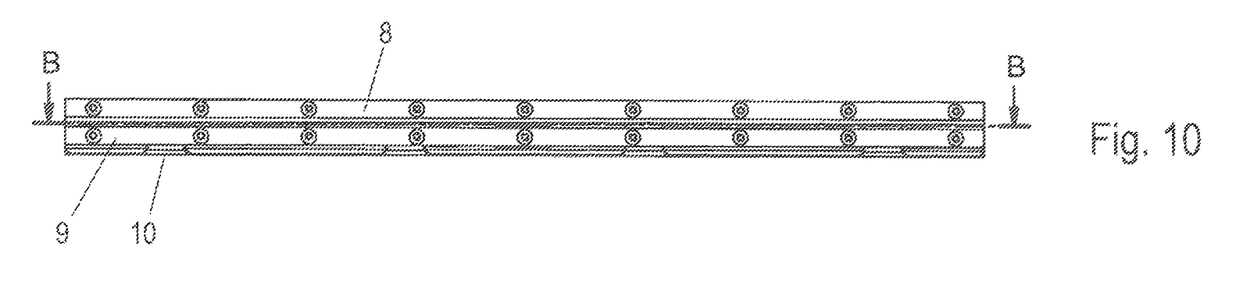
FIG. 10 shows an illustration of the latching strips in the unlatched position corresponding to FIG. 6.
Figure 11:
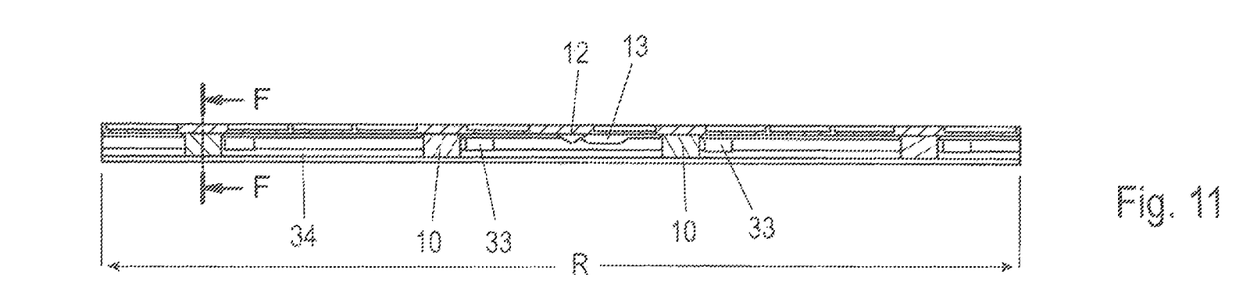
FIG. 11 shows a sectional view through a line of intersection designated in FIG. 10 with B-B.
Figure 12:
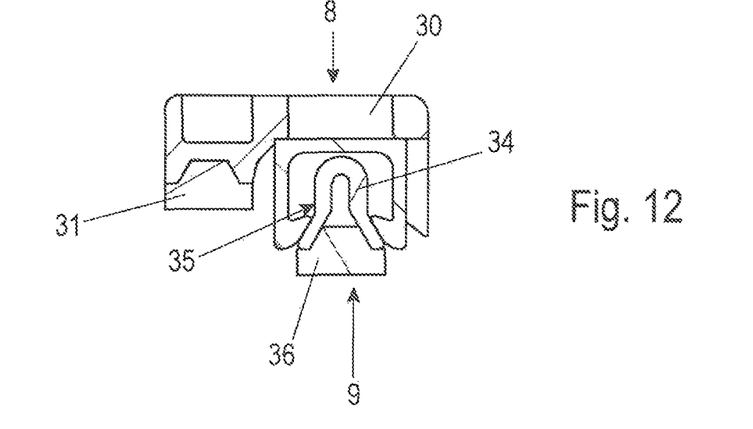
FIG. 12 shows a sectional view of the latching strips in the unlatched state along a line of intersection in FIG. 11 designated with F-F.

These closing elements are formed as latching strips 8, 9 which are oriented in parallel with respect to each other and can be latched onto each other. The latching strips 8, 9 are formed in such a way that they are displaceable from a mutually latched transport position closing the transport bag 1 at the bottom end, as shown in FIGS. 4 and 6 to 9, by mutual displacement in the direction of the longitudinal axis I of the latching strips 8, 9 to an unlatching position as shown in FIGS. 10 to 12, in which the latching strips 8, 9 are releasable from each other, for the purpose of opening the transport bag 1 at the bottom end.

As is shown in FIGS. 6 to 12, at least two latching elements 10 are arranged on the first latching strip 8, which latching elements are spaced from each other in the direction of its longitudinal axis I and which are held in latching recesses 11 of the second latching strip 9 in the mutually latched state of the latching strips 8, 9, which latching recesses are also spaced from each other in the direction of their longitudinal axes I. Screws 32, 38 clamp the respective bag sidewalls in the respective latching strips 8, 9.

The latching recesses 11 are preferably formed as a undercuts that are formed by enlarged latching regions 33 of the second latching strip 9, which, when shaped in their section in a preferably mushroom-shaped manner, protrude beyond an outer contour 35 in the latched state between the latching elements 10 of the first latching strip 8.

The distance of the latching regions 33 of the second latching strip 9 corresponds to the distance of the latching elements 10 in the longitudinal direction of the latching strips 8, 9 from each other.

The latching strips 8, 9 are preferably formed in an equally long manner, as shown in FIGS. 10 and 11.

The first latching strip 8, in the state when latched together with the second latching strip 9, is arranged by an offset amount p in the direction of its longitudinal axis I in a parallel offset manner in relation to the second latching strip 9. The offset amount p of the parallel offset of the latching strips 8, 9 is preferably between 1 cm and 10 cm, especially preferably between 1 cm and 5 cm.

The latching elements 10 are brought out of engagement of the latching recesses 11 by displacement of the latching strips 8, 9 in the longitudinal direction I from the latching position shown in FIG. 10 to the illustrated final latching position, as shown in FIG. 12 for example.

The latching strips 8, 9 are thus released from each other so that an item disposed in the transport bag 1 can fall out downwardly by the opening of the bag base produced by the mutually spaced latching strips 8, 9 and can be removed via a chute 24 for example to an unloading station, as shown in FIG. 13.

Figure 7:
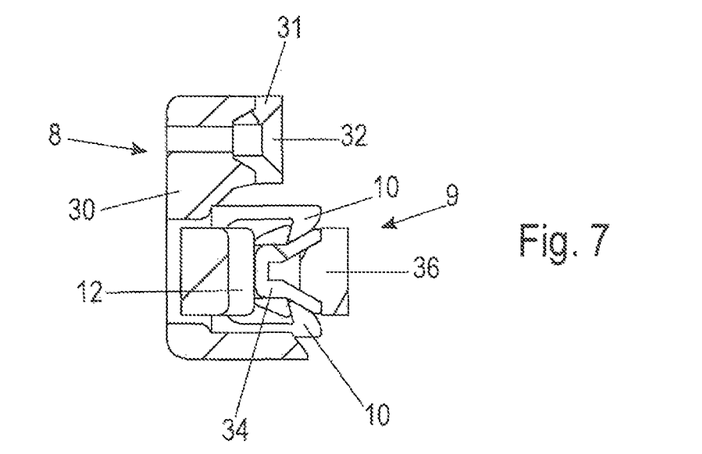
FIG. 7 shows a sectional view of the mutually latched latching strips along a line of intersection designated in FIG. 6 with A-A.
Figure 8:
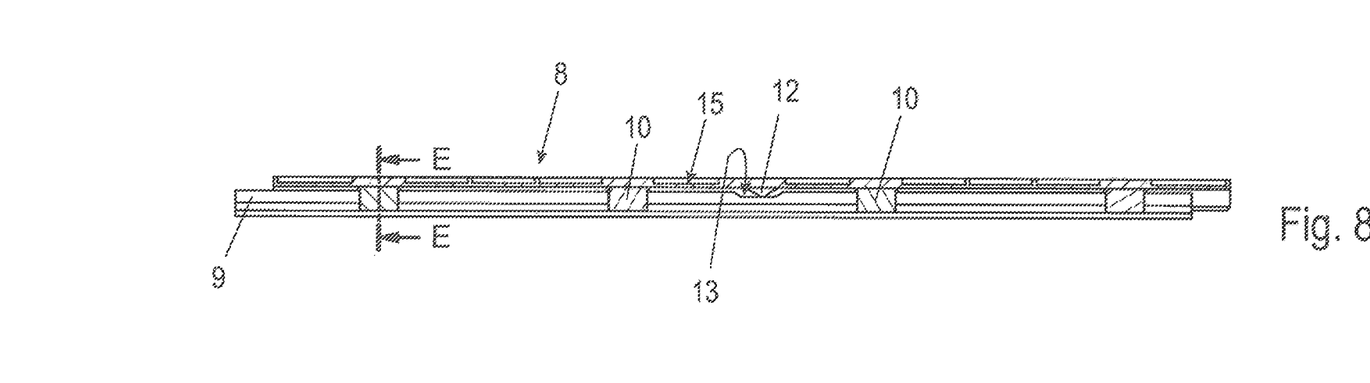
FIG. 8 shows a sectional view of the mutually latched latching strips along a line of intersection designated in FIG. 6 with C-C.
Figure 9:
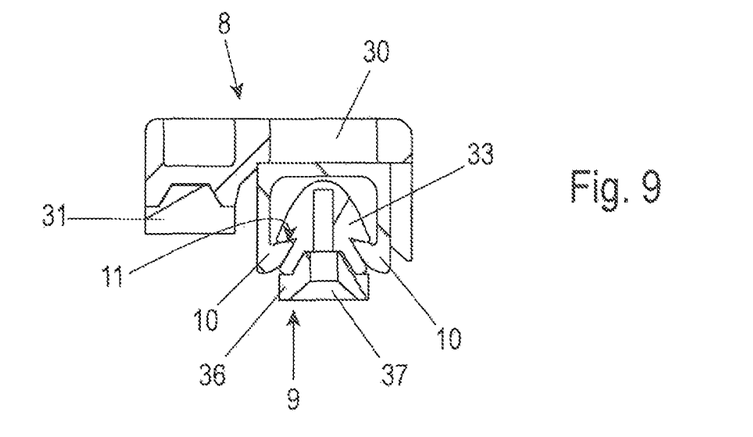
FIG. 9 shows a sectional view of the mutually latched latching strips along a line of intersection designated in FIG. 8 with E-E through a latching region of the latching strips.

As shown in FIGS. 7, 9 and 12, the latching elements 10 are preferably formed as hooks. In the embodiment shown in FIGS. 7, 9 and 12, the latching elements 10 are formed in a C-shaped manner and engage around the latching regions 33 of the second latching strips 9 on both sides.

It can also be considered to form the latching elements 10 as L-shaped hooks which engage behind the undercuts 11 of the second latching strip 9 in an alternating manner.

In order to press the two latching strips 8, 9 apart after the performed displacement of the latching strips 8, 9 relative to each other to the unlatching position as shown in FIG. 11, at least one lug, which protrudes in the direction of the second latching strip 9, is integrally formed on the first latching strip 8, as shown by way of example in FIG. 11.

The lug 12 rests in the mutually latched state of the latching strips 8, 9 in a recess 13 on a side edge 15 of the second latching strip 9 facing the first latching strip 8. The width of the recess 13 in the direction of the longitudinal axis I of the second latching strip 9 is dimensioned in such a way that the lug 12, when the latching strips 8, 9 are displaced to the unlatching position as shown in FIG. 11, is pushed out of the recess 13 and thus presses the second latching strip 9 away from the first latching strip 8 perpendicularly to the direction of the longitudinal axis I of the latching strips 8, 9.

Figure 3:
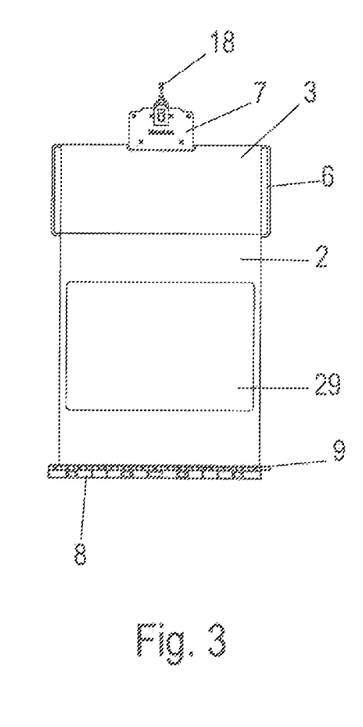
FIG. 3 shows a front view of the transport bag shown in FIG. 1.

The latching strips 8, 9 are fixed in one position to the respective bag walls 2, 3, e.g. clamped thereon, so that in the state when suspended from the rod assembly 6 they are positioned offset with respect to each other, for example as shown in FIG. 3. The latching strips 8, 9 comprise a respective base body 30, 36 for fixing the latching strips 8, 9 to the respective bag wall 2, 3, on which a respective clamping part 31, in form of a clamping strip, can be fixed by means of screws 37, wherein the bottom edge of the respective bag wall 2, 3 is clamped between the base body 30 and the clamping part 31.

Figure 14:
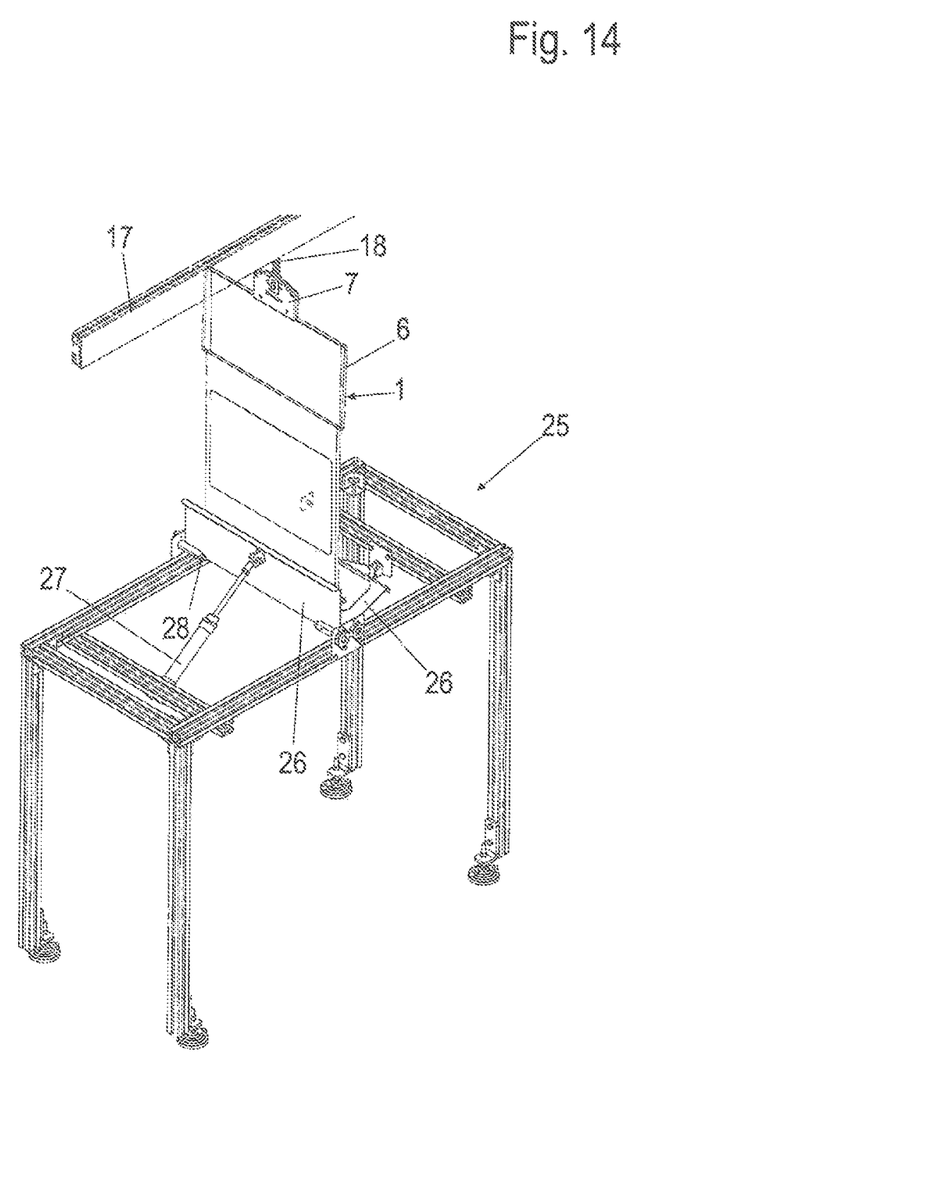
FIG. 14 shows a perspective view of an embodiment of a bag closing station of the conveying apparatus.

The latching strips 8, 9 allow simple latching by pressing the latching strips 8, 9 towards each other in a bag closing station 25, as shown for example in FIG. 14, so that the transport bag 1 can be closed again after the completed discharge by guiding the bag walls 2, 3 together again.

A section of a conveying apparatus in accordance with the invention for transporting items is shown in FIG. 13, which in this case is an unloading station 19.

Transport bags 1 filled with an item to be transported and which arrive at the unloading station 19 are emptied here, wherein the latching strips 8, 9 are moved from their latching position to the unlatching position for emptying.

For this purpose, the unloading station 19 comprises two pressure stamps 20, with pressure surfaces 21 extending perpendicularly to the direction of the longitudinal axis I of the latching strips 8, 9 and between which the transport bag 1 can be positioned.

The pressure stamps 20 are displaceable in this case in the direction of the longitudinal axis I of the latching strips 8, 9 in such a way that the distance between the pressure stamps 20 is variable between an insertion amount E which is greater than the total length of the parallel offset latching strips 8, 9 in the mutually latched state and an unlatching amount R which corresponds to the length of the latching strips 8, 9.

It can also be considered to displaceably mount only one of the pressure stamps 20 on a frame 22 of the unloading station 19 of the conveying apparatus.

For the purpose of the mechanically occurring unlatching of the latching strips 8, 9, the pressure stamps 20 are mounted by means of a drive 23 on the frame 22, which drive is preferably formed as an electromotive drive.

The chute 24 is positioned beneath the pressure stamps 20, for the purpose of removing the item transported by the transport bag 1.

The subsequent re-closure of the transport bag 1 preferably occurs in a bag closing station 25 provided downstream in the transport direction x, as shown in FIG. 14 by way of example.

The bag closing station 25 comprises two pressure plates 26 that can be moved towards each other perpendicularly to the direction of the longitudinal axis I of the latching strips 8, 9 and between which the transport bag 1 can be positioned.

The pressure plates 26 can be moved from a position accommodating the mutually separated latching strips 8, 9 between themselves to a closing position pressing the latching strips 8, 9 together perpendicularly to the direction of the longitudinal axis I of the latching strips 8, 9 and mutually latches said latching strips.

In the illustrated embodiment of the bag closing station 25, the pressure plates 26 are pivotable about a pivot axis 28 extending parallel to the longitudinal axis of the latching strips 8, 9.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Transport bag
2 First wall of the bag
3 Second wall of the bag
4 Side wall
5 Side wall
6 Rod assembly
7 Suspension apparatus
8 First latching strip
9 Second latching strip
10 Latching element
11 Latching recess
12 Lug
13 Recess
14 Side edge
15 Side edge
16 Bag filling opening
17 Rail profile
18 Holding adapter
19 Unloading station
20 Pressure stamp
21 Pressing surface
22 Frame
23 Drive
24 Chute
25 Bag closing station
26 Pressure plate
27 Actuating rod
28 Pivot axis
29 Plate
30 Base body
31 Clamping part
32 Screw
33 Latching region
34 Unlatching region
35 Outer contour
36 Base body
37 Screw
38 Screw
P Offset amount
X Transport direction
E Insertion amount
R Unlatching amount

What is claimed is:

1. A transport bag for a conveying apparatus, comprising:
a first bag wall;
a second bag wall;
a suspension arranged at an upper end of one of the first and second bag walls,
closing elements arranged on a bottom end of the first and second bag walls remote from the suspension, wherein the closing elements are reversibly coupleable to each other and with which the bottom ends of the first and second bag walls are connectable to each other to form a bag base,
wherein the closing elements are mutually latchable latching strips oriented in parallel with respect to each other,
wherein the latching strips are formed in such a way that the latching strips are displaceable from a mutually latched transport position closing the transport bag at a bottom end of the transport bag by displacement against each other in a direction of a longitudinal axis of the latching strips to an unlatching position in which the latching strips are releasable from each other for opening the transport bag at the bottom end of the transport bag.

2. The transport bag of claim 1, wherein at least two latching elements, which are mutually spaced in the direction of the longitudinal axis, are arranged on the first latching strip, wherein the at least two latching elements are held in latching recesses of the second latching strip in a mutually latched state of the latching strips, wherein the latching recesses are spaced from each other in the direction of the longitudinal axis.

3. The transport bag of claim 1, wherein the latching strips have an equal length, and wherein the first latching strip, when latched with the second latching strip, is arranged in the direction of the longitudinal axis in a parallel offset manner in relation to the second latching strip.

4. The transport bag of claim 3, wherein the offset amount of the parallel offset of the latching strips is between 1 cm and 5 cm.

5. The transport bag of claim 2, wherein the latching elements are hooks and the latching recesses is an undercut.

6. The transport bag of claim 5, wherein the latching elements have a C-shape configured to engage behind the undercuts of the latching recesses.

7. The transport bag of claim 1, wherein at least one lug, protruding in a direction of the second latching strip, is integrally formed on the first latching strip, wherein the lug rests in a recess on a side edge of the second latching strip facing the first latching strip in a mutually latched state of the latching strips, wherein a width of the recess is dimensioned in the direction of the longitudinal axis of the second latching strip in such a way that the at least one lug, when the latching strips are displaced to an unlatched position, is pushed out of the recess.

8. The transport bag of claim 7, wherein the ends of the first and second bag walls, close to the suspension, are fastened to a rod that is pivotable about a pivot axis oriented parallel to the longitudinal axis of the latching strips and which forms a bag filling opening, wherein the suspension is fixed to the rod.

9. The transport bag of claim 1, wherein the first and second bag walls are connected to each other by two foldable side walls.

10. The transport bag of claim 1, wherein the latching strips are tightly clamped to the first and second bag walls.

11. A conveying apparatus for transporting items, comprising:
- a rail profile with a transport chain that is moveable in a transport direction;
- a holding adapter configured to hold a respective item to be transported;
- at least one transport bag with a suspension configured to be suspended in the holding adapter;
- a loading station; and
- an unloading station,
- wherein the at least one transport bag further comprises a first bag wall;
  - a second bag wall, wherein the suspension is arranged at an upper end of one of the first and second bag walls;
  - closing elements arranged on a bottom end of the first and second bag walls remote from the suspension, wherein the closing elements are reversibly coupleable to each other and with which the bottom ends of the first and second bag walls are connectable to each other to form a bag base,
  - wherein the closing elements are mutually latchable latching strips oriented in parallel with respect to each other,
  - wherein the latching strips are formed in such a way that the latching strips are displaceable from a mutually latched transport position closing the transport bag at a bottom end of the transport bag by displacement against each other in a direction of a longitudinal axis of the latching strips to an unlatching position in which the latching strips are releasable from each other for opening the transport bag at the bottom end of the transport bag.

12. The conveying apparatus of claim 11, wherein the unloading station comprises two pressure stamps with pressure surfaces extending perpendicularly to the direction of the longitudinal axis of the latching strips, wherein the transport bag is positionable between the two pressure stamps, wherein at least one of the pressure stamps is displaceable in the direction of the longitudinal axis of the latching strips in such a way that a distance between the pressure stamps is variable between an insertion amount, which is greater than a total length of the parallel offset latching strips in a mutually latched state, and an unlatching amount, which corresponds to a length of the latching strips.

13. The conveying apparatus of claim 12, further comprising:
- a bag closing station downstream of the unloading station in the transport direction, the bag closing section comprising two pressure plates moveable towards each other perpendicularly to the direction of the longitudinal axis of the latching strips and between which the transport bag is positionable, wherein the bag closing pressure plates are moveable from a position accommodating the mutually separated latching strips between themselves to a closing position compressing the latching strips perpendicularly to the direction of the longitudinal axis of the latching strips and latches the latching strips together by movement of the bag closing pressure plates towards each other.

14. The conveying apparatus of claim 12, wherein the pressure plates are pivotable about a pivot axis extending parallel to the longitudinal axis of the latching strips.

15. A method for opening a transport bag in a conveying apparatus comprising a rail profile with a transport chain that is moveable in a transport direction; a holding adapter configured to hold a respective item to be transported; at least one transport bag with a suspension configured to be suspended in the holding adapter; a loading station; and an unloading station, wherein the at least one transport bag further comprises a first bag wall, a second bag wall, wherein the suspension is arranged at an upper end of one of the first and second bag walls, closing elements arranged on a bottom end of the first and second bag walls remote from the suspension, wherein the closing elements are reversibly coupleable to each other and with which the bottom ends of the first and second bag walls are connectable to each other to form a bag base, wherein the closing elements are mutually latchable latching strips oriented in parallel with respect to each other, wherein the latching strips are formed in such a way that the latching strips are displaceable from a mutually latched transport position closing the transport bag at a bottom end of the transport bag by displacement against each other in a direction of a longitudinal axis of the latching strips to an unlatching position in which the latching strips are releasable from each other for opening the transport bag at the bottom end of the transport bag, wherein the method comprises:
- moving the transport bag along the rail profile into the unloading station between the two pressure stamps;
- moving two pressure stamps of the unloading station to a respective distance from each other corresponding to an unlatching amount, wherein the latching strips are displaced from the latching position closing the transport bag at the bottom end by displacement relative to each other in the direction of the longitudinal axis of the latching strips to an unlatching position in which the latching strips are released from each other, in order to open the transport bag at the bottom end.

16. A method for closing a transport bag in a conveying apparatus comprising a rail profile with a transport chain that is moveable in a transport direction; a holding adapter configured to hold a respective item to be transported; at least one transport bag with a suspension configured to be suspended in the holding adapter; a loading station; and an unloading station, wherein the at least one transport bag further comprises a first bag wall, a second bag wall, wherein the suspension is arranged at an upper end of one of the first and second bag walls, closing elements arranged on a bottom end of the first and second bag walls remote from the suspension, wherein the closing elements are reversibly coupleable to each other and with which the bottom ends of the first and second bag walls are connectable to each other to form a bag base, wherein the closing elements are mutually latchable latching strips oriented in parallel with respect to each other, wherein the latching strips are formed in such a way that the latching strips are displaceable from a mutually latched transport position closing the transport bag at a bottom end of the transport bag by displacement against each other in a direction of a longitudinal axis of the latching strips to an unlatching position in which the latching strips are releasable from each other for opening the transport bag at the bottom end of the transport bag, wherein the method comprises:
- moving the transport bag along the rail profile from the unloading station to a bag closing station downstream in the transport direction between the two pressure plates of the bag closing station, wherein the two pressure plates are moveable towards each other perpendicularly to the direction of the longitudinal axis of the latching strips, moving the two pressure plates of the bag closing station from a position accommodating the mutually separated latching strips between themselves to a closing position compressing the latching strips perpendicularly to the direction of the longitudinal axis of the latching strips and latches them together in this process, for closing the transport bag at the bottom end.

* * * * *